United States Patent
Ravel (10) Patent No.: US 9,134,965 B2
(45) Date of Patent: Sep. 15, 2015

(54) METHOD FOR DEVELOPING SOFTWARE AND SYSTEM THEREFOR

(71) Applicant: Christian Ravel, London (GB)

(72) Inventor: Christian Ravel, London (GB)

(73) Assignee: RICOH COMPANY, LTD., Tokyo (JP)

( * ) Notice: Subject to any disclaimer, the term of this patent is extended or adjusted under 35 U.S.C. 154(b) by 122 days.

(21) Appl. No.: 14/036,226

(22) Filed: Sep. 25, 2013

(65) Prior Publication Data
US 2014/0096107 A1    Apr. 3, 2014

(30) Foreign Application Priority Data

Sep. 28, 2012   (EP) ..................... 12186736

(51) Int. Cl.
*G06F 9/44*   (2006.01)

(52) U.S. Cl.
CPC .. *G06F 8/30* (2013.01); *G06F 8/36* (2013.01); *G06F 8/70* (2013.01)

(58) Field of Classification Search
CPC .......................................... G06F 8/30
USPC .......................................... 717/107
See application file for complete search history.

(56) References Cited

U.S. PATENT DOCUMENTS

| | | | |
|---|---|---|---|
| 2006/0129972 A1* | 6/2006 | Tyburski et al. ............. | 717/106 |
| 2007/0299825 A1 | 12/2007 | Rush et al. | |
| 2009/0055809 A1* | 2/2009 | Campbell ..................... | 717/140 |
| 2010/0262950 A1* | 10/2010 | Garland ........................ | 717/113 |
| 2010/0293533 A1* | 11/2010 | Andrade et al. .............. | 717/140 |
| 2011/0208785 A1* | 8/2011 | Burke et al. .................. | 707/803 |
| 2011/0321004 A1* | 12/2011 | Ng et al. ........................ | 717/107 |
| 2012/0324417 A1* | 12/2012 | Somani et al. ................ | 717/101 |
| 2013/0007701 A1* | 1/2013 | Sundararam .................. | 717/109 |
| 2013/0047140 A1* | 2/2013 | Shann et al. .................. | 717/128 |
| 2013/0124611 A1* | 5/2013 | Thormaehlen et al. ....... | 709/203 |
| 2013/0219361 A1* | 8/2013 | Fiebig et al. .................. | 717/121 |
| 2014/0096107 A1* | 4/2014 | Ravel ............................ | 717/107 |

FOREIGN PATENT DOCUMENTS

WO   WO 2009/026565 A1   2/2009

OTHER PUBLICATIONS

European Search Report dated Dec. 11, 2012.

(Continued)

*Primary Examiner* — Don Wong
*Assistant Examiner* — Theodore Hebert
(74) *Attorney, Agent, or Firm* — IPUSA, PLLC (57) ABSTRACT

A method for developing software includes providing a source component repository storing source code of multiple software components, providing a binary component repository storing binary code of the multiple software components, editing the source code included in a component of the multiple software components, downloading the binary code included in at least one other component of the multiple software components, and generating a target application from a combination of the component including the edited source code and the at least one other component including the downloaded binary code. The source code of each of the multiple software components is individually editable. Each of the multiple software components is configured to perform a single and complete function. Each of the multiple software components is substantially independent of any runtime environment. The binary code of each of the multiple software components is individually downloadable.

16 Claims, 7 Drawing Sheets

(56) References Cited

OTHER PUBLICATIONS

Fowler Martin : "Inversion of Control Containers and the Dependency Injection pattern", Internet Citation, Jan. 23, 2004, pp. 1-19, XP002666834, Retrieved from the Internet: URL: http://martinfowler.com/articles/injection.html [retrieved on Jan. 11, 2012].

"Beans, BeanFactory and the ApplicationContext", Internet Citation, Dec. 24, 2006, pp. 1-36, XP002485758, Retrieved from the Internet: URL: http://web.archive.org/web/20061224230611/http://static.springframework.org/spring/docs/1.2.x/reference/beans.html [retrived on Jun. 24, 2008].

* cited by examiner

METHOD FOR DEVELOPING SOFTWARE AND SYSTEM THEREFOR

BACKGROUND OF THE INVENTION

1. Field of the Invention

The present invention relates to a method for developing software and to a system therefor.

2. Description of the Related Art

A software application can be installed into a multifunctional peripheral (MFP) to achieve advanced printing and scanning functions. For instance, a software application may provide user authentication and secure printing and scanning based on the user credentials and authorizations. Another software application may provide scan functions such as "scan to email" and "scan to folder", etc. Also, a software application may be dedicated to scan and print through a cloud environment. A user may choose a software application according to their needs and install it into an MFP (Multi-Function Peripheral). Such software applications can be used on other devices such as a smartphone, for example.

When a software application is created separately, integration with other applications can be difficult. Also, some software applications have multiple pieces of code for performing a similar function. As a result, performance is decreased, which might be critical on a limited-memory device. Moreover, when there are multiple software applications, each software application may be described by different source code. In this case, when a developer needs to debug a portion of code that is duplicated in multiple applications, the developer must debug the source code of multiple software applications. This takes significant time and effort. Hence, development of a software application is slow. It can also be difficult to maintain the developed software applications.

SUMMARY OF THE INVENTION

The present invention may provide a method for developing software and to a system therefor that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a method for developing software and to a system therefor particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a method for developing software that includes providing a source component repository storing source code of multiple software components, providing a binary component repository storing binary code of the multiple software components, editing the source code included in a component of the multiple software components, downloading the binary code included in at least one other component of the multiple software components, and generating a target application from a combination of the component including the edited source code and the at least one other component including the downloaded binary code. The source code of each of the multiple software components is individually editable. Each of the multiple software components is configured to perform a single and complete function. Each of the multiple software components is substantially independent of any runtime environment. The binary code of each of the multiple software components is individually downloadable.

Other objects, features and advantages of the present invention will become more apparent from the following detailed description when read in conjunction with the accompanying drawings.

BRIEF DESCRIPTION OF THE DRAWINGS

The present invention will be described, by way of example, with reference to the accompanying drawings, in which.

DETAILED DESCRIPTION OF THE PREFERRED EMBODIMENTS

Figure 1:
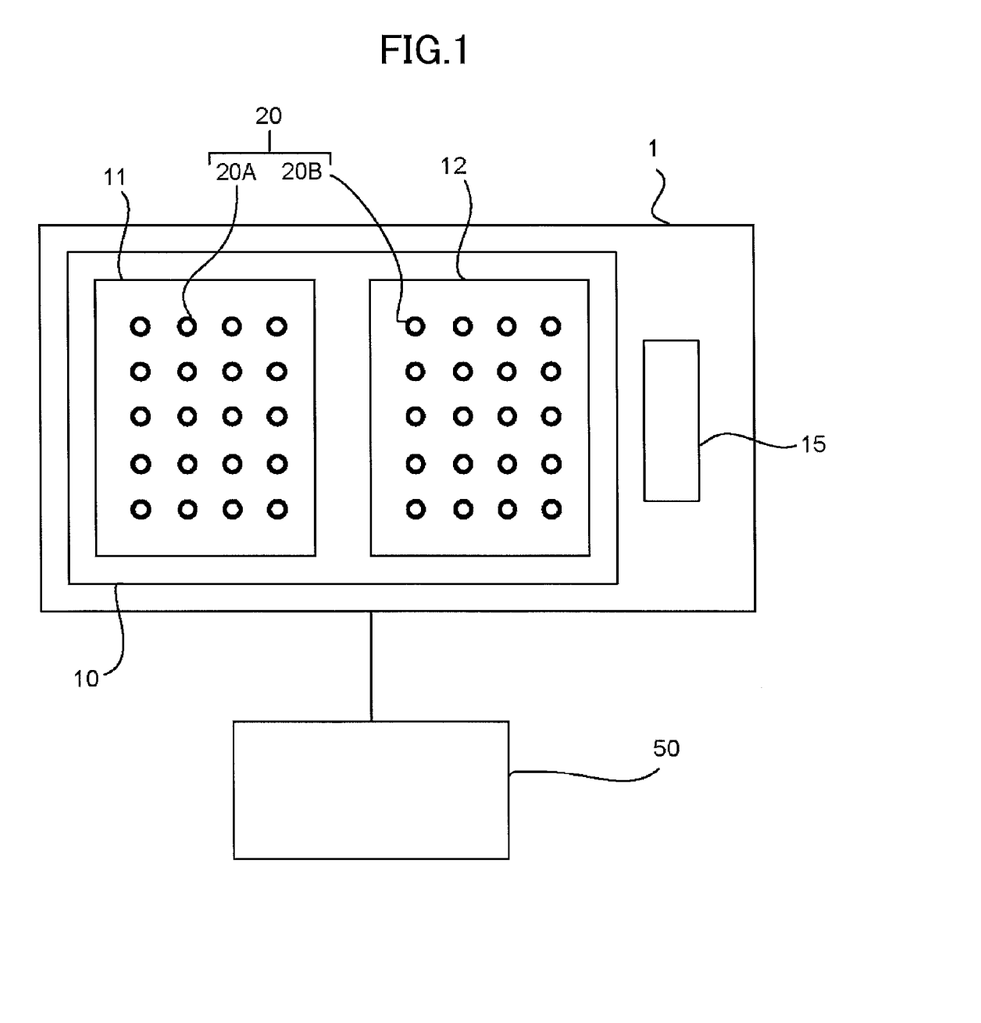
FIG. 1 depicts a system according to an embodiment of the present invention.

FIG. 1 depicts a system according to an embodiment of the present invention. The system comprises a storage memory 10 and a processor 15.

The system stores a source component repository 11 storing source code 20A of a plurality of software components 20. The source code 20A of each software component 20 is individually editable. In an embodiment, the source component repository 11 is stored in the storage memory 10 of the system.

A developer can access the source code 20A of an individual software component 20. The developer can edit the source code 20A of that software component 20 without affecting the source code of other software components stored in the source component repository 11.

In an embodiment, a developer can download the source code 20A of an individual software component 20 for editing. For example, a developer may download the source code 20A onto a terminal 50. The developer may edit the source code 20A at the terminal 50.

The system comprises a binary component repository 12. The binary component repository 12 stores binary code 20B of the plural software components 20. In an embodiment, the binary component repository 12 is provided in the storage memory 10 of the system. The binary code 20B of each software component 20 is individually downloadable.

This allows the developer to download the binary code 20B of an individual software component 20 without downloading the binary code of other software components. For example, a developer may download the binary code 20B of one or more software components 20 onto the terminal 50.

The terminal 50 is connected to the storage memory 10 of the system. The terminal 50 is connected to the processor 15 of the system.

In an embodiment, the storage memory 10 and the processor 15 are provided in a single server 1. However, this need not necessarily be the case. For example, the storage memory 10 may be provided on a different server from the server that comprises the processor 15.

In an embodiment, the binary component repository 12 and the source component repository 11 are stored in the same storage memory 10. However, this need not necessarily be the case. In an embodiment, the system comprises at least two memories, the source component repository 11 being provided on one of the memories and the binary component repository 12 being provided on another of the memories of the system.

The system is configured to download, once the source code 20A of a component 20 of the plural software components has been edited, the binary code 20B of at least one other component 20 of the plural software components. The developer can download the binary code 20B of unedited software components 20. The developer can download the binary code 20B of a software component 20 without having to download the source code 20A of that software component 20.

In an embodiment, the system is configured to generate a target application 25 from the edited component and the at least one downloaded component. Accordingly, the target application can be produced in an efficient way by editing an individual software component 20 and downloading the binary code 20B of other required software components 20.

Each software component 20 may be used in several different software applications 25 that perform different functions. Hence, the individual software components 20 are general-purpose software parts.

Figure 2:
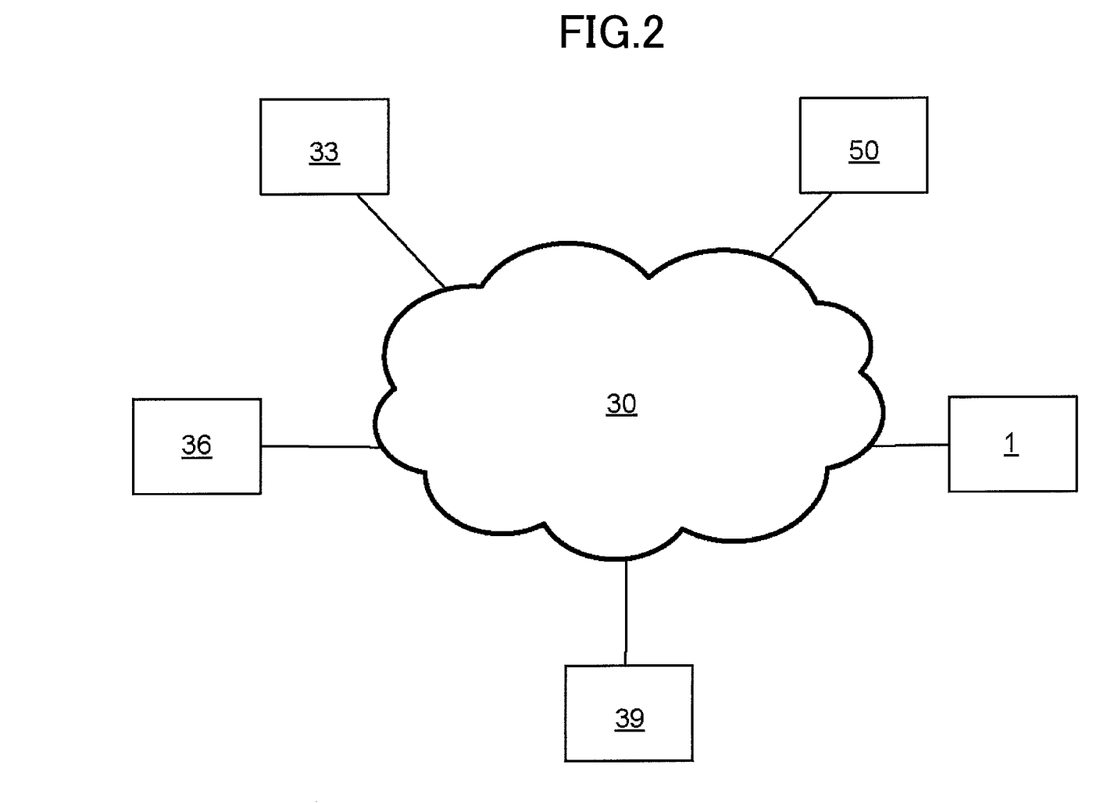
FIG. 2 depicts devices connected via a network according to an embodiment of the present invention.

FIG. 2 depicts devices connected via a network 30. For example, the terminal 50 may be connected to the server 1 via the network 30. In an embodiment, a MFP (Multi-Function Peripheral) 33 is connected to the network 30. In an embodiment, a smartphone 36 is connected to the network 30. Other devices 39 may also be connected to the network 30.

The network 30 may be implemented by any medium or mechanism that provides for the exchange of data between the various devices in the arrangement depicted in FIG. 2. Examples of the network 30 include a local area network, a wide area network, an Ethernet or the internet, or one or more terrestrial, satellite or wireless links.

Figure 3:
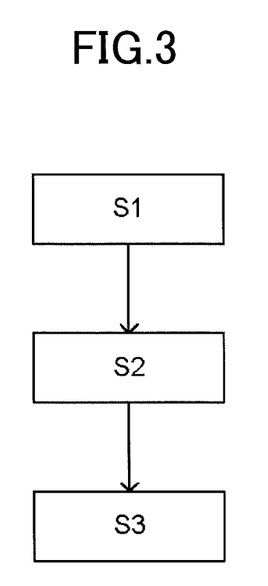
FIG. 3 depicts a method according to an embodiment of the present invention.

FIG. 3 depicts schematically a flow chart corresponding to a method according to an embodiment of the present invention.

The present invention provides a method for developing software. In an embodiment, the method comprises providing the source component repository 11 storing the source code 20A of the plural software components 20. The source code 20A of each software component 20 is individually editable. In an embodiment, the method comprises providing the binary component repository 12 storing the binary code 20B of the plural software components 20. The binary code 20B of each software component 20 is individually downloadable.

In an embodiment, the method comprises editing S1 the source code 20A of a component 20 of the plural software components.

In an embodiment, the method comprises storing the edited component 20 in the source component repository 11 as a new version of the component 20. This allows both the old and new versions of the software component 20 to be stored in the component repository 11, 12. In an embodiment, multiple version of a software component 20 may be stored.

A new version of a software component 20 may be tested before it is used to replace an earlier version of the software component 20 in software applications 25 that use that software component.

In an embodiment, the method comprises identifying software applications 25 that use the component 20 that has been updated; and testing the identified software applications 25, the software applications 25 using the updated component. Hence each new version of a software component 20 can be tested to check that it works correctly in each of the software applications that rely on that software component 20.

In an embodiment, the method comprises performing continuous integration to test an updated component 20. The continuous integration comprises, for each updated component 20, testing each affected software application and generating a report based on the testing.

In an embodiment, the method comprises downloading S2 the binary code 20B of at least one other component 20 of the plural software components.

This means that the developer does not need to re-write the source code of other software components required for the target application 2. Further more, it is not necessary to transform the source code for the whole target application into binary code. In an embodiment the method comprises transforming only the source code 20A of an updated software component 20 into binary code.

In an embodiment, the method comprises generating S3 a target application 25 from a combination of the edited component and the at least one downloaded component. The binary code of each of the software components, including the edited (i.e. updated, or new) software component, are combined to generate the target application 25.

Figure 4:
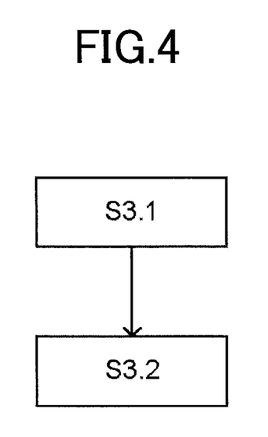
FIG. 4 depicts a method of generating a target application according to an embodiment of the present invention.

FIG. 4 depicts further detail of the generating step (for generating the target application 25) according to an embodiment of the invention.

In an embodiment, the generating step S3 comprises forming a packaged component from the component combination.

In an embodiment, the forming step (for forming the packaged component) comprises defining S3.1 links between the edited component and the at least one downloaded component.

The software components 20 can be created, updated and maintained as abstract entities in the component repository 11, 12. This improves the efficiency of developing software. However, when a target application is developed, strong links can be formed between the software components 20 of the software application 25.

Instead of using metadata to make dynamic links between the software components 20 at runtime, static links are created at generation. This may be done by changing the binary code 20B of the software components 20 without changing the source code 20A of the software components 20. This allows a new software application 25 to be generated efficiently, while maintaining an abstract set of software components 20 (in source code, and corresponding binary code) for generating further, different software applications 25.

In an embodiment, the generating step S3 comprises providing S3.2 information identifying a set of fixed implementation classes to the packaged component to implement an interface between the packaged component and a runtime environment, thereby generating the target application 25 that is dependent on the runtime environment.

Accordingly, the software application 25 can be fixed to a particular runtime environment. The fixed implementation classes (or concrete classes) enable the software application 25 to be run on a particular runtime environment, for example a particular hardware device. Once the information identifying the set of fixed implementation classes has been provided, the classes can be loaded statically rather than dynamically. Meanwhile, a single packaged component can be used to form multiple different applications 25 (albeit performing the same underlying function) on different runtime environments.

In an embodiment, the generating step S3 is completed before runtime of the target application 25. This means that it is not necessary to dynamically resolve class links for the software application 25 at runtime. Classes are not dynamically loaded at runtime. Instead, classes may be loaded statically at runtime. This reduces the memory required at the hardware device for running the software application 25.

Making the software dependent on the runtime environment before runtime distinguishes the present invention over known software development schemes in which class links are resolved dynamically at runtime of the software application, which is known for some plug-ins for example.

In an embodiment, information regarding the implementation of the software is injected statically before runtime. In an embodiment of the present invention, no link related to the runtime environment is resolved dynamically at runtime of the software application 25. Instead, class links related to the runtime environment are resolved statically at runtime.

Static class loading occurs when the name of the class to be loaded is known to the compiler, and the full name can be placed in the class file. The name in the class file is used to load the class. Dynamic class loading is when code requests class loading by using the class name during execution. This approach is called dynamic because the program can compute the class name to load on the fly. There is no way for the compiler to know what class might be requested.

In an embodiment, the method comprises providing information identifying a second set of fixed implementation classes to the packaged component to implement an interface between the packaged component and a second runtime environment, thereby generating a second target application that is dependent on the second runtime environment.

Hence, the same packaged component can be used to form two or more target applications 25 for different runtime environments. This improves the efficiency of generating applications 25 for different runtime environments, where the same underlying function is used in the different applications 25. Of course, further target applications dependent on further runtime environments can be produced by loading different sets of fixed implementation classes at runtime. In this case, information identifying the different sets of fixed implementation classes may be provided before runtime. This allows the classes to be loaded statically rather than dynamically.

Figure 5:
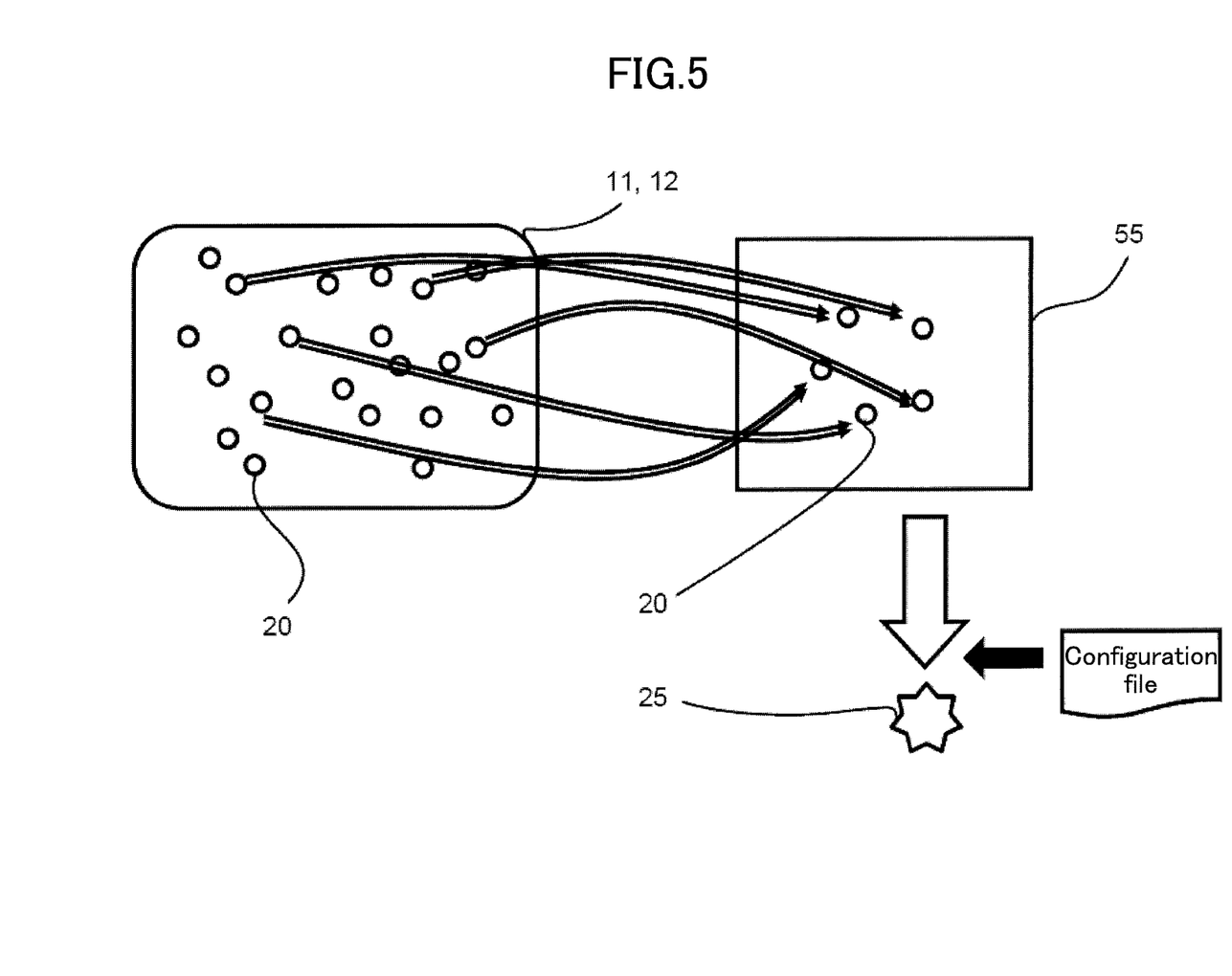
FIG. 5 depicts a conceptual schematic drawing of steps to create software applications according to an embodiment of the present invention.

FIG. 5 shows a conceptual drawing of steps to create software applications 25 by the present invention.

Each software component 20 that forms the software application 25 is stored in a component repository 11, 12 on a server 1. Specifically, in an embodiment, the source code 20A of each software component 20 is stored in a source component repository 11 and the binary code 20B of each software component 20 is stored in a binary component repository 12.

In an embodiment, the source component repository 11 and/or the binary component repository 12 are implemented using the Apache MAVEN component repository.

In a development environment 55, a developer accesses the source code 20A of any of the software component 20 they are to modify or create. Other necessary software components 20 can be automatically downloaded from the binary component repository 12.

The target application 25 is generated from the software components 20. The target application 25 is generated by, for example, defining the links between the software components 20 and providing S3.2 the fixed implementation classes to the packaged component formed from a combination of the software components 20.

The provision of the information that identifies the set of fixed implementation classes to S3.2, and the provision of information regarding the particular runtime environment to the packaged component, may be performed by dependency injection. Dependency injection can be performed using software such as Spring.

In the context of the present invention, the information identifying the set of fixed implementation classes are provided to the packaged component during generation of the target application 25. By providing the information identifying the set of fixed implementation classes to the packaged component, the packaged component can be made dependent on a particular context (e.g. a smartphone 36 or a MFP 33). By injecting statically the information identifying the set of fixed implementation classes to the packaged component during generation of the software application 25 before runtime, the amount of memory required to run the software application 25 is reduced. At runtime the set of fixed implementation classes can be loaded statically.

By providing a different set of fixed implementation classes to the packaged component, it is possible to generate the same underlying software application for various environments (e.g. different underlying technologies such as different operating systems, connection to different environment servers, etc).

According to the present invention, the implementation of a packaged component is separated from the function of the packaged component. This allows the same underlying packaged component to be implemented on various runtime environments by just changing the implementation of the packaged component.

In the present invention, all of the software components 20 may be reused for different software applications. The packaged component (which is itself a combination of software components 20) may also be reused to form different software applications 25.

In an embodiment, each software component 20 is for performing a single and complete function. Hence, each software component 20 is a piece of code that performs one task and has high cohesion. Desirably, the number of software components 20 is kept to a minimum. Desirably the number of software components is substantially equal to the number of different functions in the system.

Desirably, there is low coupling between the software components. This allows the software components to be relatively abstract, i.e. independent from the context in which they may be implemented. The abstract software components 20 may then be combined to create software applications 25. Desirably, the repetition of code between different software components 20 is kept to a minimum.

The principle of low coupling is not only about runtime environment minimal dependency. It is for minimal dependency (low coupling) applied everywhere as much as possible, by separating the different concepts in different components that are minimally dependent of each other if dependency is not required. In an embodiment each software component is independent of the other software components. In an embodiment, the method comprises performing an audit on the component repository 11, 12. The audit comprises monitoring the size of each of the software components 20 stored in the repository and monitoring the amount of coupling between the software components 20. The audit may be performed by analyzing the source code 20B stored in the source component repository 11. The audit may be performed by SONAR, for example.

The audit allows a moderator to monitor whether any component is too coupled to other components and so needs to be edited to reduce the coupling. Each component 20 is desirably small (e.g. performs a single function). Hundreds of software components may be combined together to generate a target application 25. A software component would be considered to be too big if it could manage an entire authentication process. In contrast, the small software components 20 in the present invention each perform a single function (e.g. logging of data).

The source code 20A of each software component 20 can be individually edited. New software components 20 can be created from scratch. Modified or new software components 20 may be versioned and uploaded to the component repository 11, 12. In the component repository 11, 12, each software component 20 has individually editable source code 20A and corresponding individually downloadable binary code 20B. This allows the new software components to be shared with other developers and used by software applications 25.

In an embodiment, the software components 20 are formed into a packaged component by defining links in at least one file (e.g. a Maven descriptor file and a Spring configuration file) stored on the server 1. The configuration file is for implementing the packaged component on a particular runtime environment. Other suitable computer languages may be used to define the links between the software components 20 to form a packaged component.

Figure 6:
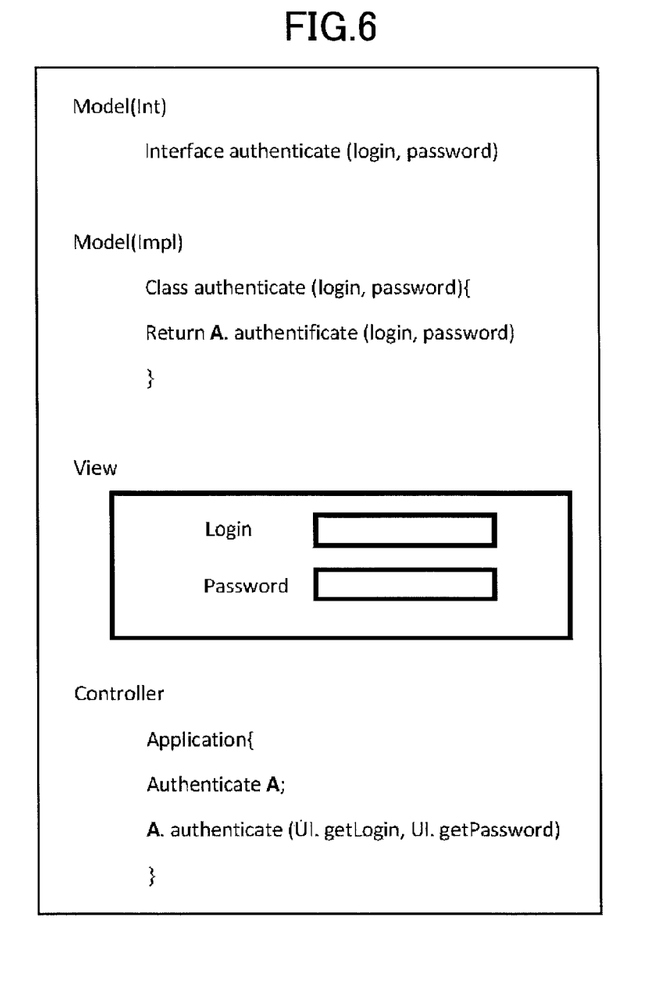
FIG. 6 depicts an example of software components for an authentication application.

FIG. 6 shows an example of the software components for an authentication application. Each of these software components are general purpose software components that can be used to implement function in a variety of contexts. This means that each of these software components could be used in a software application that performs a different function from that of the authentication application.

In the example depicted in FIG. 6, depending on what is input in "A", the authentication procedure can be conducted by different means at the hardware device. For example, an address book may be chosen as a means for authentication. In this case, the address book would be input as "A" in the Controller section of the authentication application. In this case, the development tool renders the of Model(Impl) as address book by loading appropriate classes.

This class loading may be performed based on the classes identified at build time (e.g. by Spring). The dependency injection can be carried out using a configuration file described in XML language, for example. In this way, linking between the authentication software application and an element used in the application (e.g. an address book, etc) is realized.

Figure 7:
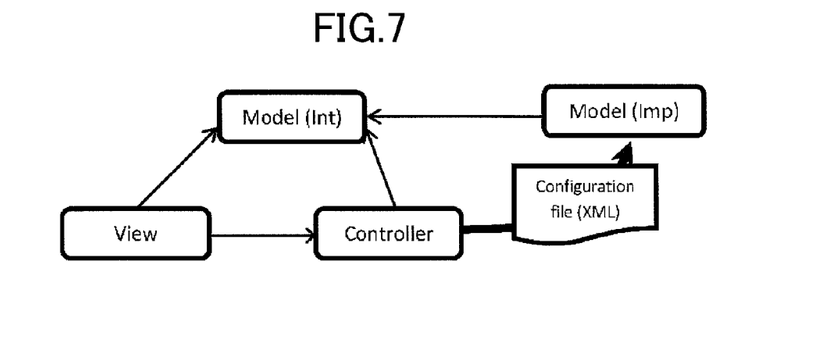
FIG. 7 depicts schematically a model-view-controller model.

FIG. 7 indicates a schematic depiction of the pattern including model-view-controller (MVC) for the authentication application of FIG. 6. MVC is a computer software design pattern that separates the representation of information from the user's interaction with it. The software is split into three sections, model view and controller. The model is a model of reality. The view comprises the user interface. The controller converts input into commands for the model or view.

In FIG. 7, each arrow between boxes means that the box from which the arrow originates depends on the box that the arrow points toward. For example, as shown in FIG. 7, the View component depends on both the Controller component and the Model(Int) component. This can be seen in FIG. 6, in which the Model(Int) component defines the inputs login and password. Hence the View component shows input fields corresponding to the login and password inputs.

Each of the software components 20 used in this example of an authentication application can be used in other software applications 25. The authentication application is explained as an example of a software application 25 that can be developed using the present invention. Of course, other software applications can be made by the same method.

For example, other software applications 25 that may be created using the present invention include a scan to email function, a scan to folder function or a scan to print function. The type of software application 25 that can be developed using the present invention is not particularly limited.

Using the present invention, it is not necessary to create each software application 25 from scratch. Furthermore, it is easier to debug a software application 25 because a developer can edit an individual software component 20 without affecting other software components. Furthermore, performance of each software application 25 can be improved by injecting static links at build time (i.e. before runtime) of the software application 25. This makes running of the software application 25 quicker and requires less memory at the hardware device.

Figure 8:
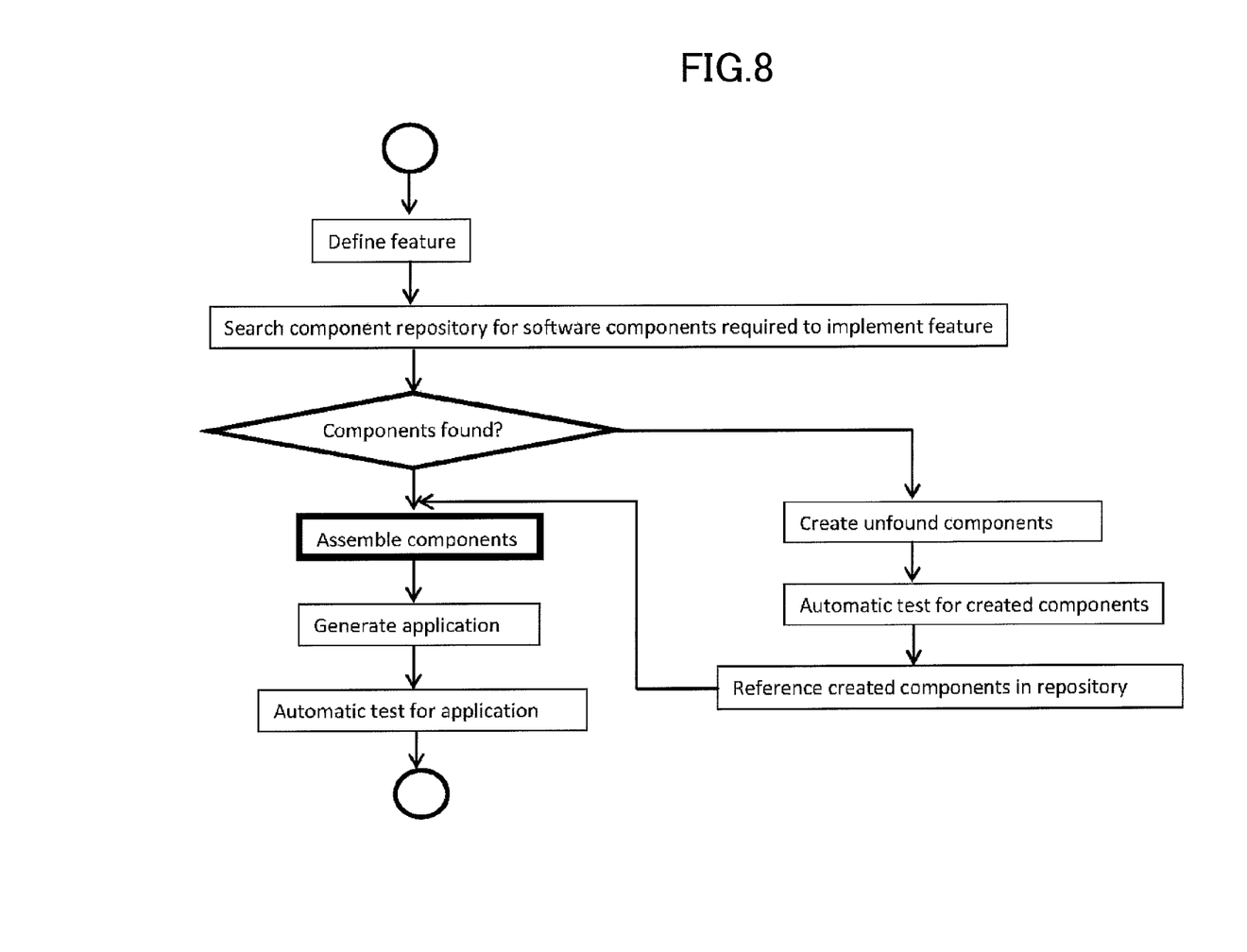
FIG. 8 depicts a method for developing software according to an embodiment of the present invention.

FIG. 8 depicts a flow chart for a method of developing software according to the present invention.

The method comprises defining a feature. The feature comprises a function that is to be performed by a target application. The feature may be, for example, an authentication function.

The method comprises searching for software components in the component repository that can implement the feature.

In an embodiment, the search is performed by using keywords. For example, in an embodiment, each software component 20 has one or more keywords stored in association with the software component to designate the type of function (i.e. function or task) that the software component 20 performs.

A developer can input keywords corresponding to the function that the target application is intended to perform. For example, for an authentication function, a developer may input keywords such as authentication and login, for example.

The method comprises the step of checking whether all of the required software components 20 exist in the component repository. Hence, the method comprises searching the source component repository 11 and/or the binary component repository 12 for software components 20 that can implement desired function for the target applications 25.

It may be determined that a component that is not stored in the source component repository 11 and/or the binary component repository 12 is required to implement the desired function. In this case, the method comprises creating the required component, then storing the required component in the source component repository 11.

Once the automatic test has been performed for the newly-created software components, the new components are referenced in the component repository (i.e. the source component repository 11 and/or the binary component repository 12).

Once the new components are referenced in the component repository 11, 12, the situation is the same as if it was determined that all of the required software components for implementing the feature exist in the component repository. At this point, the next step in the method is to assemble the identified software components 20.

The software application 25 can then be generated. An automatic test can then be performed for the generated software application 25.

Figure 9:
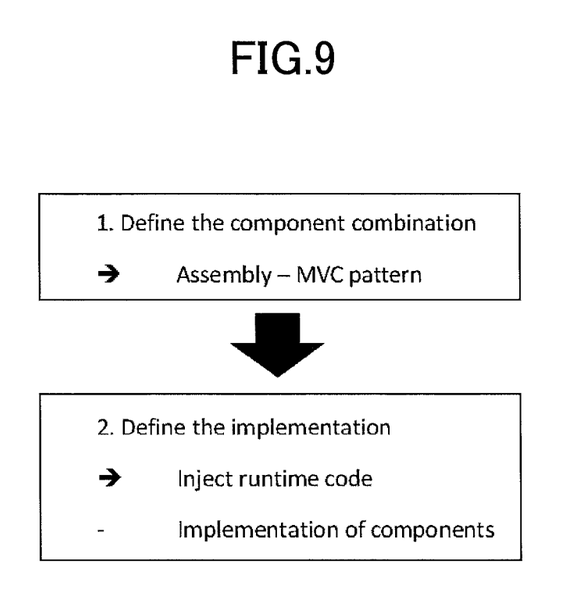
FIG. 9 depicts a method of assembling software components according to an embodiment of the present invention.

FIG. 9 depicts steps to assemble software components according to an embodiment of the present invention.

One step is to define the software application 25. This involves selecting the software components that are required to perform the function of the software application 25. The selected software components 20 can be combined to form a component combination.

In an embodiment, a component combination is based on model-view-controller (MVC). In an embodiment, the software components 20 are described by JAVA. The software components are stored in the component repository (i.e. the source component repository 11 and the binary component repository 12). The software components are chosen to form a component combination. A packaged component is formed from the component combination.

For example, if each of the software components is "log-in", "capture images" and "send them", then these software components are used to build one packaged component that includes these three software components 20.

XML (or another configuration language) may be used to link the software components 20 to each other. Each software component 20 may have an extension point described in XML. There may be another XML file, which defines the linking rule of each of the extension points. The XML files may be previously defined by a developer and stored in the server 1.

The packaged component is itself a software component 20 that can be stored in the component repository. The packaged component is a reusable software component 12. In an embodiment, the packaging may be executed using MAVEN.

The second step depicted in FIG. 9 involves performing dependency injection on the packaged component. For example, if the execution of the software application 25 is on an MFP 33, then the dependency injection allows the software application 25 to achieve functions defined by the software components 20 on an MFP 33. For example, the "log-in" software components may be implemented to perform a log-in operation for an MFP 33. The "capture images" software component may be implemented to perform a scanning operation. The "send them" software component may be implemented to perform a send-to-folder operation.

If the software application 25 is simply implemented on a smartphone 36, for example, then the dependency injection would be performed in a different way so as to create a different software application in which each software component 20 is implemented on the smartphone 36. In this case, the "log-in" software component may be implemented as a log-in function for the smartphone 36. The "capture images" software component may be implemented to take a photo. The "send them" software component may be implemented by emailing the taken photo to another device.

The steps depicted in FIG. 9 for assembling the software components may be conducted on a software application development tool, such as Eclipse. However, other software application development tools may also be used to assemble the software components to form the software application.

While specific embodiments of the invention have been described above, it will be appreciated that the invention may be practiced otherwise than as described. For example, the invention may take the form of a computer program containing one or more sequences of machine-readable instructions describing a method as disclosed above, or a data storage medium (e.g. semiconductor memory, magnetic or optical disk) having such a computer program stored therein.

The descriptions above are intended to be illustrative, not limiting. Thus, it will be apparent to one skilled in the art that modifications may be made to the invention as described without departing from the scope of the claims set out below. For example, fixed implementation classes may not be provided to the packaged component before runtime. In this case, the packaged component may be for a plug-in, for which resolving classes to be loaded may take place dynamically at runtime.

An embodiment of the present invention is based on a combination of different technologies and patterns, which are listed below.

Maven is a component technology. Maven provides repositories for binary components. Maven provides a system for management of dependencies between components.

Spring is a dependency injection technology. Spring provides a system for changing the source code at build-time to "inject" implementation class dependencies.

MVC pattern promotes the separation of concern between Model, View and Controller.

Low coupling/High cohesion pattern promotes the optimization of content of a piece of code (i.e. software component) to make it easier to maintain.

Continuous integration provides a system for controlling continuously the situation of all software developments according to the present invention.

An embodiment of the present invention involves combining these technologies and patterns in a system for the development of software. An embodiment of the present invention increases the efficiency and the quality of software development.

Accordingly, with the above-described method and system according to an embodiment of the present invention, by providing the component repositories such that each component has individually editable source code and individually downloadable binary code, a developer can edit the source code of a single component without affecting the source code of other components. This allows the developer to concentrate on developing the source code of a single component. This reduces the possibility of the developer adversely affecting the source code of other components that may be used in other software applications. The developer can improve the source code of a single component, which may be used by multiple different software applications. This increases the efficiency of improving multiple software applications.

Furthermore, when developing a new software application, the developer can download the binary code of components that are not being edited so as to form the software application in an efficient way. As a result, it is not necessary to transform the source code of an entire software application into binary code every time a new software application is developed. Instead, only the source code of an edited component needs to be transformed into binary code. This increases the efficiency of the software development.

Accordingly, with the above-described method and system according to an embodiment of the present invention, the packaged component can be used to generate a general software application that can be run on different runtime environments (possibly related to different pieces of hardware), as required. The package component can be specified to a particular runtime environment by providing information identifying the set of fixed implementation classes. Information regarding the particular runtime environment is injected. This improves the efficiency of generating software applications that perform the same function for use on different runtime environments.

With the above-described method and system according to an embodiment of the present invention, for software development purposes, individual software components can be edited, providing a powerful way of developing new software applications. Meanwhile, by defining the links between the software components of the software application during generation of the target application, the software application can have strong links between the software components ready for runtime of the software application.

With the above-described method and system according to an embodiment of the present invention, the configuration files can be previously designed by developers before they are used or reused for a specific software application. This allows the specific software application to be developed rapidly. Furthermore, when software applications are updated by updating of a single software component, the updated version of the software application can be rapidly produced.

With the above-described method and system according to an embodiment of the present invention, the same packaged component can be used to form two target applications for different runtime environments. In particular, the two target applications may have the same function, but implemented on different runtime environments, thereby providing two different target applications. This provides a quick and powerful way of producing similar software applications for different runtime environments.

With the above-described method and system according to an embodiment of the present invention, the amount of memory required to run the software application at a hardware device is reduced. In particular, when the fixed implementation classes are provided before runtime to the packaged component formed from the combination of components, it is not necessary to load these fixed implementation classes dynamically at runtime. Instead, the classes related to the particular runtime environment may be loaded statically. This allows the software application to be run on runtime environments with very limited memory resources.

With the above-described method and system according to an embodiment of the present invention, it is possible to update (e.g. so as to improve) an individual software component without adversely affecting existing software applications that use the software component. For example, where a software application relies on the old version of a software component, this function is not disrupted by storing an updated version of that software component. This improves the quality of software development.

With the above-described method and system according to an embodiment of the present invention, the software affected by each updated component can be tested. This is a robust test of the updates made to an individual software component that may be used in multiple software applications.

With the above-described method and system according to an embodiment of the present invention, where there are existing software components that perform the desired function, it is not necessary to re-develop a new software component for performing that function. This reduces replication of effort in developing software for performing common function. This saves time and effort in developing new software applications. In particular, by using the same software component in multiple software applications, the software development process is made more efficient and quick.

Accordingly, with the above-described method and system according to an embodiment of the present invention, when an entirely new function is required, a new software component can be stored in the repository. That new software component can then be used for later developed software applications. Accordingly, the number of times that each piece of function (i.e. function) needs to be coded into a software component is reduced to one time.

Accordingly, the above-described method and system according to an embodiment of the present invention can be used to improve the development of software for various functions such as many functions performed on MFPs, for example.

Accordingly, the above-described method and system according to an embodiment of the present invention can be used to develop software applications for various different runtime environments.

Accordingly, with the above-described method and system according to an embodiment of the present invention, abstract software components can be combined together to perform desired function of a target application in an efficient way. The function can be formed so as to be independent of the context (i.e. runtime environment) in which is will be used. This allows different software applications to be generated by changing the implementation of the basic logic that is formed based on model-view-controller pattern.

The present invention is not limited to the specifically disclosed embodiments, and variations and modifications may be made without departing from the scope of the present invention.

The present application is based on and claims benefit of priority of European Priority Application No. 12186736.0 filed on Sep. 28, 2012, with the European Patent Office, the entire contents of which are hereby incorporated by reference.

What is claimed is:

1. A method for developing software, the method comprising the steps of:
   providing a source component repository storing source code of a plurality of software components,
   providing a binary component repository storing binary code of the plurality of software components;
   editing, by one or more processors, the source code included in a component of the plurality of software components;
   downloading by one or more processors, the binary code included in at least one other component of the plurality of software components; and
   generating, by one or more processors, a target application from a combination of the component including the edited source code and the at least one other component including the downloaded binary code; said target application being dependent on a particular runtime environment;
   wherein the source code of each of the plurality of software components is individually editable,
   wherein each of the plurality of software components is configured to perform a single and complete function,
   wherein each of the plurality of software components is independent of any runtime environment;
   wherein the binary code of each of the plurality of software components is individually downloadable, and
   wherein the generating step includes the steps of:
      forming, by one or more processors, a packaged component that describes the combination of the component including the edited source code and the at least one other component including the downloaded binary code, and
      providing, by one or more processors, information identifying a set of fixed implementation classes to the packaged component, to implement an interface between the packaged component and the particular runtime environment.

2. The method as claimed in claim 1, wherein the forming step includes defining links between the component including the edited source code and the at least one other component including the downloaded binary code.

3. The method as claimed in claim 2, wherein the links are defined in at least one configuration file stored on a server that stores at least one of the source component repository and the binary component repository.

4. The method as claimed in claim 1, further comprising:
providing information identifying a second set of fixed implementation classes to the packaged component to implement an interface between the packaged component and a second runtime environment,
thereby generating a second target application that is dependent on the second runtime environment.

5. The method as claimed in claim 1, wherein the generating step further includes injecting information identifying a particular implementation of the packaged component on the particular runtime environment such that the target application is dependent on the particular runtime environment.

6. The method as claimed in claim 1, wherein the generating step is completed before runtime of the target application such that at runtime substantially all class loading related to the particular runtime environment is performed statically.

7. The method as claimed in claim 1, further comprising a step of: storing the edited component in the source component repository as a new version of the component.

8. The method as claimed in claim 1, further comprising the steps of:
identifying software applications that use the component that has been updated; and
testing the identified software applications;
wherein the identified software applications use the updated component.

9. The method as claimed in claim 8, further comprising a step of searching at least one of the source component repository and the binary component repository for components that can implement a desired function for the target application.

10. The method as claimed in claim 9, further comprising the steps of:
determining that a component that is not stored in at least one of the source component repository and the binary component repository is required to implement the desired function;
creating the required component; and
storing the required component in the source component repository.

11. The method as claimed in claim 1, wherein the target application is used for user authentication, a scan to email function, a scan to folder function or a scan to print function.

12. The method as claimed in claim 1, wherein the runtime environment is a MFP (Multi-Function Peripheral), a smartphone, a desktop application or a server application.

13. The method as claimed in claim 1, wherein the combination of the component including the edited source code and the at least one other component including the downloaded binary code is based on a model-view-controller pattern.

14. A system comprising:
a storage memory; and
a processor;
wherein the system, by way of the storage memory, stores
a source component repository storing source code of a plurality of software components, and
a binary component repository storing binary code of the plurality of software components,
wherein the source code of each of the plurality of software components is individually editable,
wherein each of the plurality of software components is configured to perform a single and complete function,
wherein each of the plurality of software components is independent of any runtime environment,
wherein the binary code of each of the plurality of software components is individually downloadable,
wherein the system, by way of the processor, is configured to
download, once the source code included in a component of the plurality of software components has been edited, the binary code included in at least one other component of the plurality software components,
generate a target application from the component including the edited source code and the at least one other component including the downloaded binary code, said target application being dependent on a particular runtime environment,
form a packaged component that describes a combination of the component including the edited source code and the at least one other component including the downloaded binary code, and
provide information identifying a set of fixed implementation classes to the packaged component, to implement an interface between the packaged component and the particular runtime environment.

15. The method as claimed in claim 1, wherein in said generating step, said information identifying the set of fixed implementation classes is provided to the packaged component by performing dependency injection on the packaged component.

16. The method as claimed in claim 4,
wherein in said generating step, said information identifying the set of fixed implementation classes is provided to the packaged component by performing a first dependency injection on the packaged component, and
wherein in the step of providing information identifying the second set of fixed implementation classes to the packaged component, a second dependency injection is performed on the packaged component, said second dependency injection differing from the first dependency injection.

* * * * *